W. T. GRIFFIN & B. W. TUCKER.
DRYING APPARATUS.
APPLICATION FILED MAY 28, 1906.

916,437.

Patented Mar. 30, 1909.
7 SHEETS—SHEET 1.

Witnesses
Thos. J. Byrnes
A. S. Dunham.

Benjamin W. Tucker
and Walter T. Griffin, Inventors,

By their Attorneys
Kerr, Page & Cooper

W. T. GRIFFIN & B. W. TUCKER.
DRYING APPARATUS.
APPLICATION FILED MAY 28, 1906.

916,437.

Patented Mar. 30, 1909.
7 SHEETS—SHEET 4.

Witnesses
Thos. J. Byrnes
S. S. Dunham.

Benjamin W. Tucker
and Walter T. Griffin, Inventors

By their Attorneys
Kerr, Page & Cooper

W. T. GRIFFIN & B. W. TUCKER.
DRYING APPARATUS.
APPLICATION FILED MAY 28, 1906.

916,437.

Patented Mar. 30, 1909.

Witnesses
Thos. J. Byrnes
S. S. Dunham

Benjamin W. Tucker
and Walter T. Griffin, Inventors

By their Attorneys
Kerr, Page & Cooper

W. T. GRIFFIN & B. W. TUCKER.
DRYING APPARATUS.
APPLICATION FILED MAY 28, 1906.

916,437.

Patented Mar. 30, 1909.
7 SHEETS—SHEET 6.

Witnesses
Thos. J. Byrnes
A. A. Dunham

Benjamin W. Tucker and
Walter T. Griffin, Inventors

By their Attorneys
Kerr, Page & Cooper

W. T. GRIFFIN & B. W. TUCKER.
DRYING APPARATUS.
APPLICATION FILED MAY 28, 1906.

916,437.

Patented Mar. 30, 1909.
7 SHEETS—SHEET 7.

Fig. 16.

Witnesses
Thos. J. Byrnes.
A. S. Dunham.

Benjamin W. Tucker
and Walter T. Griffin, Inventors

By their Attorneys
Kerr, Page & Cooper

UNITED STATES PATENT OFFICE.

WALTER T. GRIFFIN, OF PLAINFIELD, AND BENJAMIN W. TUCKER, OF NEWARK, NEW JERSEY, ASSIGNORS, BY DIRECT AND MESNE ASSIGNMENTS, TO ISIDORE PEDRAZA, OF PARIS, FRANCE.

DRYING APPARATUS.

No. 916,437.   Specification of Letters Patent.   Patented March 30, 1909.

Application filed May 28, 1906. Serial No. 319,120.

*To all whom it may concern:*

Be it known that we, WALTER T. GRIFFIN, a citizen of the United States, residing at Plainfield, in the county of Union and State of New Jersey, and BENJAMIN W. TUCKER, a citizen of the United States, residing at Newark, in the county of Essex and State of New Jersey, have invented certain new and useful Improvements in Drying Apparatus, of which the following is a specification, reference being had to the drawings accompanying and forming part of the same.

Our invention relates to drying apparatus, more particularly for drying material in such state of division as will permit it to be carried by conveyers, preferably of the screw type, and has for its chief object to provide an apparatus which shall perform its desired functions with a high degree of efficiency.

A further object is to provide an apparatus which can be constructed at comparatively low cost.

The embodiment illustrated and described herein is designed more particularly for drying peat, preparatory to subsequent treatment for the manufacture of fuel gas, coke, briquets, or other products, but it will be clear to those skilled in the art that the apparatus can be used for other materials as well, and can be modified within considerably wide limits, when necessary for a particular purpose, without departure from the proper scope of the invention, which consists of the novel features of construction, arrangements of parts, and combinations of elements described hereinafter and more particularly defined by the appended claims.

In carrying out our invention in its preferred form we provide a considerable number of conveyers of suitable length, and arrange the same in horizontal banks or rows, one row above the other. The conveyers of one row or bank communicate with each other at their ends, so that material deposited in the first will pass successively through all the conveyers in the row, while the last conveyer of each row delivers the material to the first of the next row, with the result that the material is carried through all the conveyers in the machine and finally discharged at the outlet of the apparatus. The conveyers are provided with outer casings or jackets, in communication with each other throughout the entire series. Steam is introduced into one or more of the jackets and flows through a suitable number of the same to the steam outlet, to heat the material in the conveyers and cause the moisture in the material to be evaporated. Provision is made for discharging the evaporated moisture from the conveyers, and, if desired, for passing it through a number of the jackets so that the heat contained in the vapor can be utilized in heating the material, thus effecting a not inconsiderable saving of fuel. The various conveyers are arranged closely adjacent to each other, thus making the apparatus more compact and reducing the loss of heat by radiation. If desired the jackets or outer casings may be covered with material of low heat conductivity, to lessen the radiation, as will be readily understood.

The embodiment thus briefly described is illustrated in the annexed drawings, to which reference may now be made.

In the drawings, Fig. 5ᵃ is a perspective view of the second bank or set of conveyers, immediately above the set shown in Fig. 5.

Figure 5:
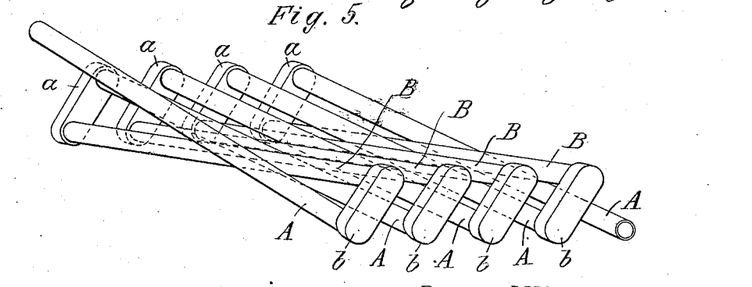
Fig. 5 is a perspective view of the first or lowermost bank or set of conveyers.
Figure 5A:
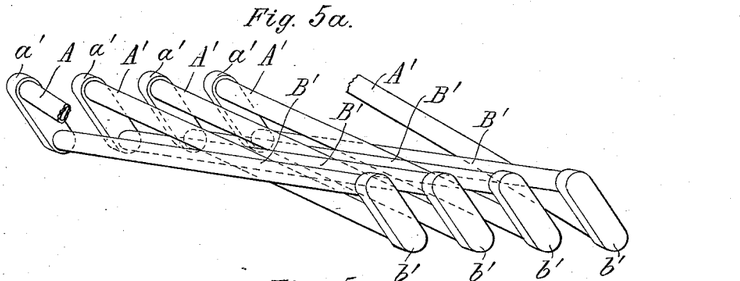

As briefly described above, the apparatus comprises a plurality of conveyers, arranged in a plurality of horizontal sets, which latter are arranged one above another in a vertical series. One of these sets, for example the first or lowermost, is shown in perspective, but somewhat diagrammatically, in Fig. 5, all details being omitted for the sake of clearness. As will be seen, the set comprises five conveyers A, inclined upward toward the rear, (hence for convenience hereinafter termed "rearward conveyers"); and, arranged alternately with these, four conveyers B, inclined upward toward the front—and hence for convenience hereinafter termed "forward conveyers". The rearward conveyers, A, discharge into rear chutes $a$, which connect with the lower or rear ends of the forward conveyers B. The latter discharge into front chutes $b$, inclined downwardly from right to left, which connect with the front or lower ends of the last four rearward conveyers. The course of the material is therefore upward to the rear through the first or inlet rearward conveyer, from which it is discharged into the first rear chute $a$. Dropping down the latter it is picked up by the first forward conveyer, B, and carried to the front of the machine, where it is delivered through the first front chute $b$ to the second rearward conveyer A, and so on to the last rearward conveyer, which rises higher than the others and carries the material to the next set of conveyers. This set is shown in Fig. 5$^a$. It contains, like the first, four forward conveyers, B', but only four rearward conveyers, A', connected in a similar manner by front and rear chutes $b'$ and $a'$ respectively, extending downward and inclined from left to right. The material discharged by the last or left hand rearward conveyer A drops through the first or left hand rear chute $a'$ of the second set, and is carried forward by the first forward conveyer B' and dropped into the first front chute $b'$ of the set, thence by the second rearward conveyer to the rear, and so on to the last or right hand rearward conveyer A'. This last conveyer rises higher than the others of its set, and carries the material to the next or third set, which is like the first set, Fig. 1, except that the place of the inlet or first rearward conveyer A of the figure just mentioned is taken by the last rearward conveyer A' of the second act. The material is therefore carried in a tortuous or zig-zag path from front to rear and from side to side throughout the apparatus and finally reaches the last conveyer of the uppermost set and is discharged from the apparatus, as will be more fully described hereinafter.

In the present embodiment of the invention there are twelve sets, with nine conveyers in the first set and nine in the twelfth, and eight in each of the other ten, making ninety-eight in the entire machine. It will therefore be seen that with conveyers of even moderate length the total distance traversed by the material is considerable, and yet within the compass of an apparatus occupying a comparatively small space. It is clear, of course, that the number of conveyers in a set, and the number of sets in the machine, are immaterial and may be varied indefinitely without departure from the spirit of the invention.

Throughout the various figures in which the conveyers appear, the rearward conveyers of the first set are designated by A, those of the second set by A', etc., those of the last or twelfth set being indicated by $A^{11}$. The forward conveyers of the first set are designated by B, those of the second set by B', etc., those of the last or twelfth set being indicated by $B^{11}$.

Figure 6:
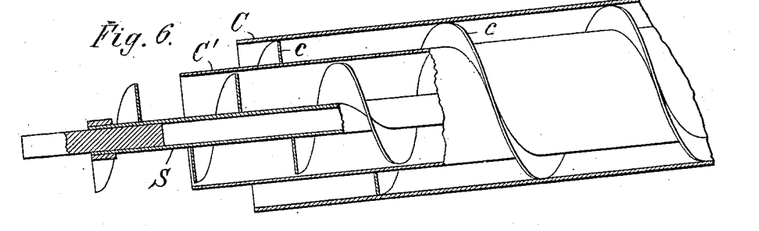
Fig. 6 shows a typical conveyer in longitudinal section, showing the arrangement of the steam jacket or casing and other parts.

The conveyer sets are arranged as shown in Figs. 1, 2, 3 and 4, with the front ends of the rearward conveyers lying between and in the same horizontal plane with the upper ends of the forward conveyers of the set immediately below. This arrangement will be better understood by imagining Fig. 5$^a$ to be lowered bodily until the lower ends of the chutes $b'$ lie between the upper ends of the chute $b$ and the lower ends of the chutes $a'$ between the upper ends of the chutes $a$. The third set, which, as before stated, is substantially a duplicate of the first, is similarly arranged above the second, in the same relation thereto, as the second is to the first. This arrangement secures maximum economy of space, as will be readily understood. The conveyers are supported at their ends in flat rectangular boxes, which are arranged in any suitable end frames merely indicated at F, F, in Fig. 3. The construction of the end boxes and the various connections therewith will be more fully described hereinafter. During its travel through the machine the material is subjected to heat, in order to vaporize the moisture in the material, and to secure this result the conveyers are constructed as follows:

Attention is directed to Fig. 6, which shows substantially the construction of each conveyer, a few being modified somewhat as will be explained hereinafter. As shown in the figure just referred to, the conveyer consists of an inner cylindrical casing C', and a screw S working within the same, which causes the material to move up through the casing. Around the latter and spaced therefrom is an outer casing or jacket C. Into the annular space between the two casings steam is introduced, by means hereafter described; and in order to prevent "short-circuiting" of the steam, as it were, and to keep it in contact with the parts for a considerable length of time in its passage from the inlet to the outlet of the outer casing, the screw or helical partition $c$ is provided between the two casings, thus making a helical passage for the steam and keeping it in contact with the parts long enough for it to give up as effective a proportion of its heat as possible. But for this helical partition the steam would take the shortest path from inlet to outlet and would give up only a comparatively small part of its heat, as will be readily understood. The casings, the screw, and the helical partition are designated by the characters applied to them above, wherever the said parts appear in the drawings.

Figure 16:
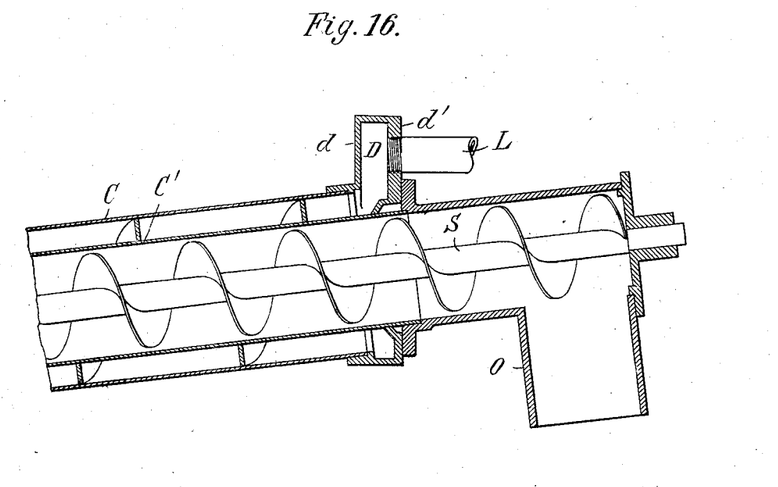
Fig. 16 is a longitudinal section of the outlet or discharge end of the last conveyer, where the dried material leaves the apparatus.

Reference is now made to Fig. 16, which shows the outlet, from which the dried material is discharged, and the inlet for live steam. These parts are located at the rear of the machine, at the position indicated by M, in the diagrammatic rear view of the apparatus, Fig. 2. D, Fig. 16, designates one of the rectangular boxes referred to above. The outer casing, C, extends into the box through the inner wall $d$ thereof, while the inner casing, C', extends through the box and discharges into a spout O, removably carried on the outer wall $d'$. The material delivered therefrom may be received by any suitable device, as a belt conveyer, and carried away. Into the box through the outer wall $d'$ extends a pipe L, which may be connected with any convenient source of live steam, not shown. The steam enters the box and flows thence through the helical passage between the two casings to the front of the machine where it is delivered through a suitable connecting pipe to the end box of the adjacent rearward conveyer. From the rear end box of the latter conveyer it goes to the next forward conveyer through a similar connecting pipe, and so on through the entire set. A typical set of boxes and their various connections is shown in Figs. 9 to 13 inclusive, the set illustrated being arbitrarily selected from about a row or two below the center of the left hand side of the front of the machine, for example the boxes at P, Fig. 1.

Figure 1:
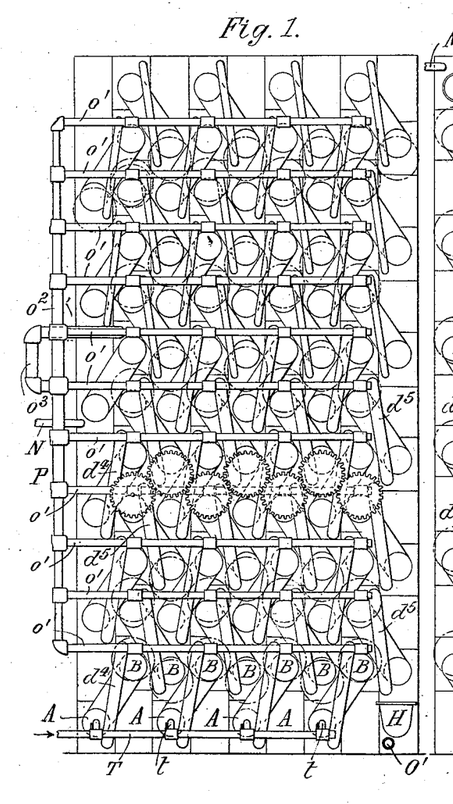
Figures 1 and 2 are diagrammatic front and rear elevations, respectively, of the apparatus.
Figures 9, 10, 11, 12, 13:
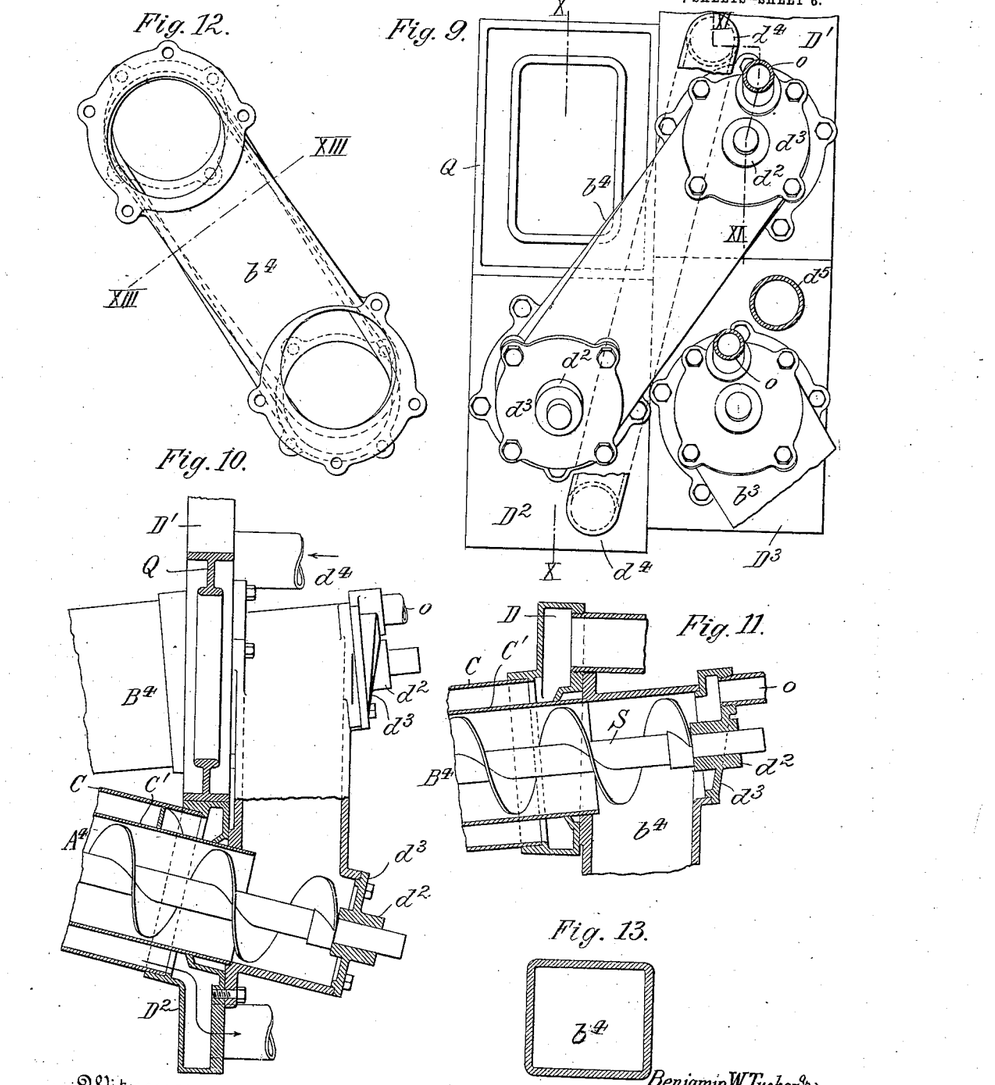
Fig. 9 is a detail end view, showing the type of chute or conduit employed to transmit the material from the upper or discharge end of one conveyer to the lower or inlet end of another, and the arrangement of coöperating parts.
Fig. 10 is a section on line X—X, of Fig. 9.
Fig. 11 is a section on line XI—XI, of Fig. 9.
Fig. 12 is a rear elevation of one of the connecting chutes between conveyers.
Fig. 13 is a section on line XIII—XIII, of Fig. 12.

Referring now to Figs. 1, 10 and 11, D' and D² designate the front boxes of the forward and rearward conveyers respectively, with the outer and inner casings connected thereto as explained above in the description of Fig. 16. The material from the forward conveyer B⁴ is discharged into the chute $b^4$, the upper end of which is removably secured over the end of the conveyer. The chute extends downward to the left and is removably secured to the box D² with its end over the end of the inner casing of the rearward conveyer A⁴, which picks up the material and conveys it to the rear, where it is delivered to the first forward conveyer of the set next above, and so on throughout the apparatus, through connections substantially like those of Figs. 9 to 13, so far as described. The chutes are of rectangular cross section in each case, as shown in Fig. 13. A rear view of a chute, removed from the machine, is shown in Fig. 12. The shafts of the conveyer screws are all conveniently journaled in bearings $d^2$ formed in plates or disks $d^3$ removably secured over openings at the ends of the chutes, as will be readily understood. As already explained the steam from the helical or tortuous passages is conducted from one box to another through connecting pipes.

Figure 2:
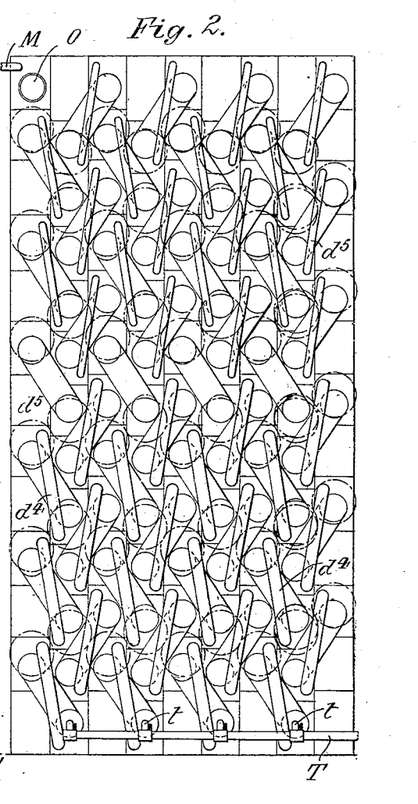

In Figs. 9, 10 and 11 one of the connecting pipes is broken away to show the arrangement of the chute more clearly, and is indicated by $d^4$. These pipes are shown in Fig. 1, extending downwardly from right to left. In Fig. 9 the box D³ is at the front end of a forward conveyer of the set next below, exactly corresponding, for example, to the set shown in Fig. 5ª, and the chute $b^3$ extends downward toward the right, to the adjacent rearward conveyer of the same set. The steam pipe connected with box D³ is shown at $d^5$. This pipe is shown in section, but extends downward to the right, and the corresponding pipes are so shown in Fig. 1. Only a few of the connecting pipes are lettered in the latter figure, to avoid complication. In Fig. 2 the pipes are shown inclined in the opposite direction in each case, since this figure is a rear view. As in the former figure only a few are lettered. It will be observed that in each set of conveyers there is a blank space at the side of the machine, both in the front and in the rear. These blanks are filled by rectangular frames, as Q, Figs. 9 and 10.

Inasmuch as the steam may have lost considerable of its heat by the time it has traversed a number of conveyers, provision is made at a suitable point in the apparatus for tapping at least a part of the steam back to the boiler for regeneration. For this purpose the pipe N, Fig. 1, is provided, in communication with the front box of a rearward conveyer, and leading to the boiler, not shown.

Figure 14:
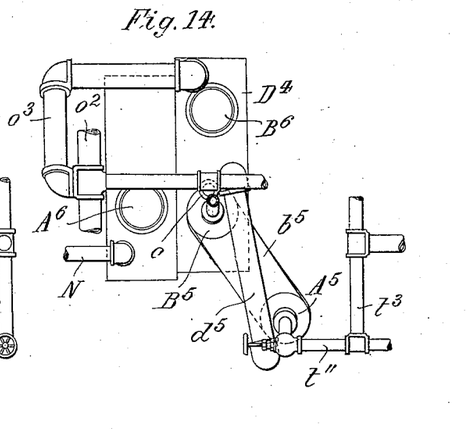
Figs. 14 and 15 are detail end and side views, respectively, showing the construction and arrangement of the various parts at the point where the steam, which circulates through the jackets or casings, leaves the apparatus.
Figure 15:
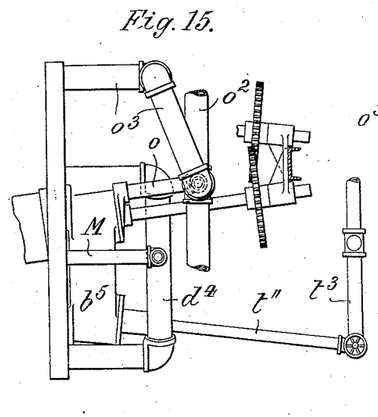

The heating of the material vaporizes the moisture therein, and to provide for the escape of this vapor each chute at the front of the machine is provided at its upper end with an outlet pipe, two of which are shown clearly at $o$, $o$, in Figs. 9, 10 and 11, and also in Figs. 15 and 16. These pipes connect with horizontal conduits $o'$, arranged across the front of the machine, which are in turn all connected at their left ends to a vertical conduit or bus-pipe $o^2$. At about the middle of the latter is an outlet pipe $o^3$, so that the vapor from all the conveyers eventually finds its way to this outlet pipe. Inasmuch as this vapor or steam is at a comparatively high temperature it is desirable to utilize its heat instead of allowing it to escape in the air and its heat thus be wasted. For this purpose the outlet pipe $o^3$ is brought back and connected with the front box of one of the conveyers, so that the vapor will be discharged into the box and mingle with the rest of the steam. This arrangement is shown more clearly in the detail views, Figs. 14 and 15, where the outlet pipe $o^3$ will be seen leading to the box $D^4$, which happens to belong to one of the forward conveyers of the seventh set, in which such conveyers are designated by $B^6$.

The pipe N, which carries steam back to the boiler for regeneration, will of course carry away only part of the steam. The rest, including that resulting from the moisture extracted from the material and discharged into the circulating system by the pipe $o^3$, flows on through the remaining conveyer jackets to an outlet $o'$, adjacent to the inlet for the material hereinafter described. Although the steam which traverses these remaining conveyers is at a lower temperature than that in the jackets nearer the live steam inlet L, it will nevertheless still do useful work in the lower conveyers, since in the latter the material is also at considerably lower temperature than in the upper conveyers. Consequently there still is a difference of temperature between the steam and the material, and the steam can still give up heat to the latter.

Figure 8:
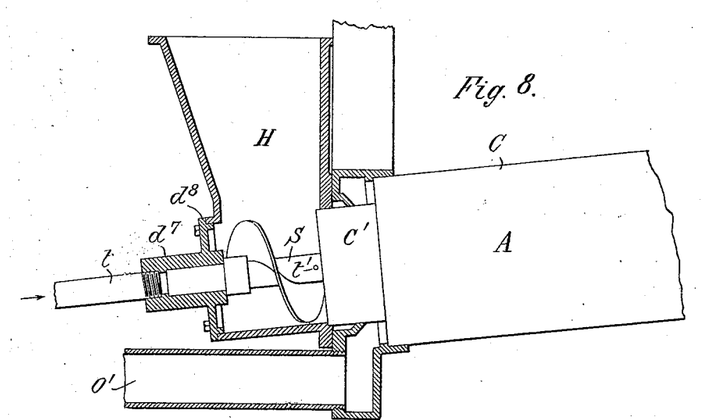
Fig. 8 shows in longitudinal section the feed or inlet end of the first conveyer, through which the material enters the apparatus.

Referring now to Fig. 8, which shows the inlet or lower end of the first or right hand conveyer of the first set, H indicates a hopper which is removably secured to the box $D^5$. The shaft of the conveyer screw is journaled in a bearing $d^7$ formed in a plate or disk $d^8$ removably secured to the lower part of the hopper. The material to be dried is deposited in the hopper and is picked up by the conveyer and carried through the apparatus in the manner already described.

For the purpose of giving the material a preliminary heating, provision is made for injecting steam, preferably superheated, into it during its passage through the first set of conveyers. For this purpose the hollow conveyer-shafts are open at their lower ends, and extending into the bearings thereof are pipes which at their other ends are connected with conduits or bus-pipes T, Figs. 1 and 2, leading from a suitable source of steam. Two of the injector pipes are shown at $t$, in Figs. 7 and 8, the former of which figures shows the lower end of one of the rearward conveyers of the first set at the left of the inlet conveyer. Only a few of the injector pipes are lettered in Figs. 1 and 2, to avoid complication. The steam thus injected into the screw-shafts is discharged into the material through openings $t'$ in the shafts and eventually finds its way to the outlet pipe $o^3$ along with the steam or vapor resulting from the moisture extracted from the material.

Figure 7:
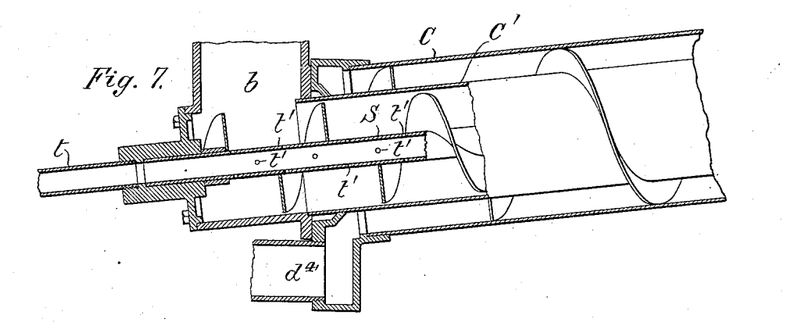
Fig. 7 shows in longitudinal section the devices employed at the ends of the conveyers to connect one with another, and show also means for injecting superheated steam into the material while being carried through the conveyer.

It may be desirable to inject superheated steam into the material at one or more other points as well as in the first set of conveyers, and for this purpose any of the other conveyers may be constructed as in Fig. 7. This provision is indicated in Figs. 14 and 15, in which $t''$ indicates a pipe for superheated steam, connected with a supply pipe $t^3$ and discharging into the shaft of the conveyer, as in Fig. 7 just mentioned. It is of course evident that the other conveyers in the same row may be constructed similarly, the inlet pipes therefor being connected with the supply pipe $t^3$.

Figure 3:
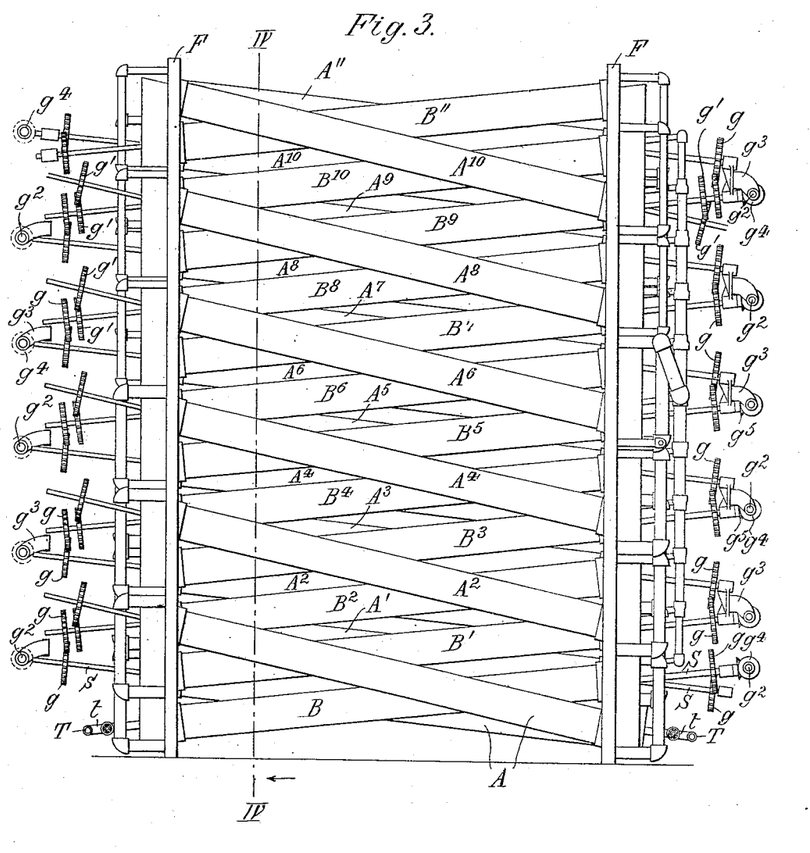
Fig. 3 is a side elevation.
Figure 4:
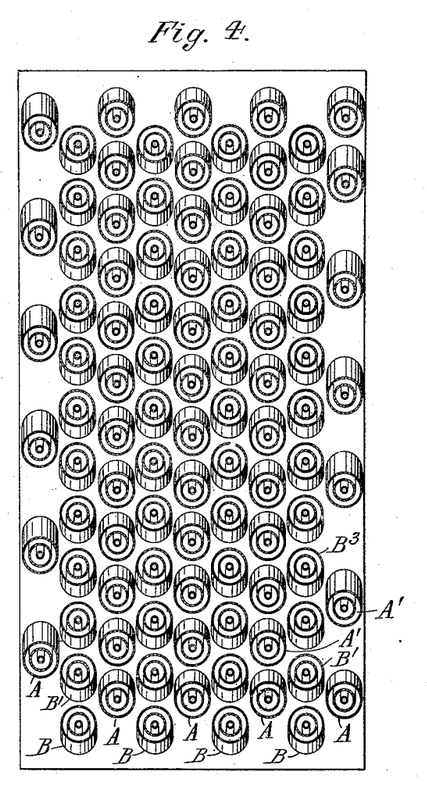
Fig. 4 is a cross section on line IV—IV, of Fig. 3.

Simple mechanism for driving the conveyer screws is illustrated in Fig. 3. For this purpose the screw shafts are extended beyond their bearings at one end or the other and carry intermeshing gears $g$. If all the screws are of the same kind, either right hand or left hand, it is of course clear that the screws in the rearward conveyers must rotate in the opposite direction to those in the forward conveyers, and hence the gears on the rearward shafts may mesh directly with those on the forward shafts. The mechanism shown in Fig. 3 is arranged on this plan, wherein each forward conveyer is geared directly to a rearward conveyer. By referring to the figure it will be seen that the rearward conveyers of the second, fourth, sixth, eighth, tenth, and twelfth sets, designated by $A'$, $A^3$, $A^5$, $A^7$, $A^9$, and $A^{11}$, respectively, are geared to the forward conveyers of the first, second, fourth, sixth, eighth, and tenth sets, designated by B, $B'$, $B^3$, $B^5$, $B^7$, and $B^9$, respectively, the gears being located at the front of the machine; while at the rear of the machine the rearward conveyers of the first, third, fifth, seventh, ninth, and eleventh sets, designated by A, $A^2$, $A^4$, $A^6$, $A^8$, and $A^{10}$, respectively, are geared to the forward conveyers of the third, fifth, seventh, ninth, eleventh, and twelfth sets, designated by $B^2$, $B^4$, $B^6$, $B^8$, $B^{10}$, and $B^{11}$, respectively. In each set the conveyer through which the material last passes, that is, the conveyer which carries the material to the set next above, is geared to the adjacent rearward or forward conveyer, as the case may be, of the set to which it carries the material. In the figure the gears just referred to are designated by $g'$.

Of these conveyers only those at the left side of the machine are shown, with their connections, but the connections of those at the right side are the same and hence need not be specifically illustrated. Extending across the front and rear of the apparatus are shafts $g^2$ journaled in bracket $g^3$ on the conveyer shafts and supported at their ends by any convenient means, not shown. On the cross shafts $g^2$ are bevel gears, as $g^4$, each shaft having a plurality of gears to mesh with similar gears, as $g^5$ (omitted at the left of the figure), on the ends of the adjacent upwardly inclined conveyer shafts. Consequently, rotation of the shafts $g^2$ at the front of the machine will drive the forward conveyers whose shafts project at the front, and the latter will drive the rearward conveyers to which they are geared; while at the rear of the machine the shafts will cause the remaining conveyers to be driven. Any suitable and convenient means for actuating the driving shafts $g^2$ may be provided, but to avoid complicating the figures no mechanism for the purpose is shown.

From the foregoing the operation of the apparatus will now be readily understood. The peat or other material to be dried is fed to the inlet hopper H, and is carried through the various conveyers in succession, from front to rear alternately, and is finally discharged at the outlet O. While in the first or lowermost set of conveyers the material is heated by the injection of superheated steam, and thereby brought quickly to a temperature sufficient at least to start evaporation of the moisture in the material. At the same time steam is introduced into the steam jacket of the last conveyer, at a point adjacent to the outlet for the dried material, and flows around the conveyers in a direction opposite to the movement of the material. At a suitable point part of the steam is withdrawn from the apparatus and led back to the boiler, for regeneration. The steam resulting from the moisture in the material escapes from the conveyers at their ends and is led from the several conveyers to a common point, where it is introduced into the current of steam flowing in the steam jackets or casings. From this point the current flows through the remaining jackets to the main steam or moisture outlet O'.

The apparatus herein specifically illustrated and described is merely one form of the invention, which can be embodied in widely differing apparatus without departure from its proper scope as defined by the following claims.

What we claim is:

1. In an apparatus for drying peat or other material, the combination of a plurality of oppositely inclined conveyers arranged side by side, boxes at the ends of the conveyers and supporting the same, chutes outside the boxes connecting the conveyers one to another, jackets around the conveyers and in communication with the boxes at the ends thereof, and pipes connecting the boxes, as set forth.

2. In an apparatus for drying peat or other material, the combination of a plurality of rearward and forward conveyers arranged side by side in alternation, boxes at the ends of the conveyers, through which boxes the conveyers extend, chutes outside the boxes connecting the outlet end of each conveyer with the inlet end of the next, whereby the material to be dried can be passed through all the conveyers of the series, jackets around the conveyers for passing steam along the same; said jackets being in communication with the boxes at the ends of their respective conveyers, and pipes from box to box, connecting the jackets in series, as set forth.

3. In an apparatus for drying peat or other material, the combination of a plurality of horizontal sets of conveyers, said sets being arranged one above the other and each set being composed of rearward conveyers inclined upwardly from front to rear and forward conveyers inclined upwardly from rear to front, said rearward and forward conveyers being arranged side by side in alternation; means for connecting the outlet end of each conveyer with the inlet end of the next conveyer in the same set, and means for connecting the outlet end of the last conveyer of each set with the inlet end of the first conveyer of the set next above, whereby the material to be dried can be passed through all the conveyers in series; boxes surrounding the ends of the conveyers; jackets around the conveyers and communicating with the boxes at the ends of the respective conveyers; and connections from box to box whereby steam may be passed through the jackets in series; as set forth.

4. In an apparatus for drying peat or other material, the combination of a pair of conveyers arranged with the outlet end of one adjacent to and higher than the inlet end of the other, boxes surrounding said inlet and outlet ends, a chute carried by the boxes outside the same and connecting the said outlet and inlet ends, jackets around the conveyers and opening into the said boxes, and a pipe connecting the boxes, as set forth.

5. In an apparatus for drying peat or other material, the combination of a plurality of rearward and forward conveyers arranged in horizontal rows, one row above the other, connections from conveyer to conveyer and from row to row, means for passing a current of steam along the conveyers to heat the material therein, and means for collecting the moisture evaporated from the material and introducing the steam thus formed into the current of steam flowing along the conveyers, as set forth.

6. In an apparatus for drying peat or other material, the combination of a plurality of conveyers arranged side by side, hollow boxes supporting the ends of the conveyers but out of communication therewith, jackets inclosing the conveyers and communicating with the boxes of the respective conveyers, connections from box to box, connections from conveyer to conveyer, and means for introducing steam into the system of jackets, as set forth.

7. In an apparatus for drying peat or other material, the combination of a conveyer, hollow boxes around the ends of the conveyer but out of communication therewith, a jacket inclosing the conveyer and communicating at its ends with the said boxes, one box having a steam inlet and the other a steam outlet, means for delivering material to the inlet end of the conveyer, and means for receiving material from the outlet end of the conveyer, as set forth.

8. In an apparatus for drying peat or other material, the combination of a conveyer, hollow boxes at the ends of the conveyer having apertures in their walls through which the ends of the conveyer extend, an inlet chute arranged to deliver material to the inlet of the conveyer, an outlet chute arranged to receive material from the outlet of the conveyer, a jacket for the conveyer, supported by and in communication with the said boxes, and steam pipes in communication with the boxes, as set forth.

9. In an apparatus for drying peat or other material, the combination of a pair of oppositely inclined conveyers located side by side and adapted to carry material in opposite directions, hollow boxes around the ends of the conveyer but out of communication therewith, a chute extending from the upper or outlet end of one conveyer to the adjacent lower or inlet end of the other, a chute arranged to deliver material to the inlet end of the first conveyer, a chute arranged to receive material from the outlet end of the other conveyer, jackets for the conveyers, in communication with their respective boxes, a steam connection from one box to the other at one end of the pair of conveyers, a steam inlet pipe for one of the boxes at the other end of the pair of conveyers, and a steam outlet pipe for the other box at that end, as set forth.

10. In an apparatus for drying peat or other material, the combination of a hollow box having an opening in one of its side walls, a smaller opening in the opposite wall and registering with the first, said box having also an aperture for a steam connection, a screw conveyer having a casing extending through the larger opening into and closely fitting the smaller opening, a jacket for the conveyer, extending into and closely fitting the larger opening, and a chute carried by the box and in communication with the conveyer, as set forth.

11. In an apparatus for drying peat or other material, the combination of a plurality of conveyers, means for passing steam over the outside of the conveyers whereby the material in the conveyers will be heated and the moisture therein converted into steam, and means for collecting the steam from the conveyers and adding it to the steam passing over the same, as set forth.

12. In an apparatus for drying peat or other material, the combination of a plurality of conveyers arranged in a plurality of horizontal rows, connected jackets for the conveyers adapted to be connected with a source of steam, pipes extending from the conveyers to carry off steam resulting from the moisture in the material in the conveyers, connecting pipes extending horizontally across the conveyer rows and receiving steam from the conveyer pipes, and a vertical bus pipe receiving steam from the connecting pipes and discharging it into the current of steam in the jackets, as set forth.

13. In an apparatus for drying peat or other material, the combination of a plurality of conveyers arranged in a plurality inlet and an outlet for the series, means for passing steam over the conveyers from the last to the first in succession, means for collecting the steam resulting from the evaporation of moisture in the material in the conveyers, and means for introducing the steam into the current of steam flowing over the conveyers, as set forth.

WALTER T. GRIFFIN.
BENJAMIN W. TUCKER.

Witnesses:
S. S. DUNHAM,
THOS. J. BYRNES.